United States Patent [19]
DeHaitre

[11] Patent Number: 5,199,839
[45] Date of Patent: Apr. 6, 1993

[54] FASTENER SCREW HAVING IMPROVED INSTALLATION AND SELF-LOCKING CHARACTERISTICS

[75] Inventor: Lon DeHaitre, Arlington Heights, Ill.

[73] Assignee: Abbott-Interfast Corporation, Wheeling, Ill.

[21] Appl. No.: 773,516

[22] Filed: Oct. 9, 1991

[51] Int. Cl.$^5$ .................. F16B 23/00; F16B 25/00
[52] U.S. Cl. .................. 411/387; 411/399; 411/919
[58] Field of Search .......... 411/386, 387, 399, 402, 411/403, 919

[56] References Cited

U.S. PATENT DOCUMENTS

| | | |
|---|---|---|
| 378,857 | 2/1888 | Woodford. |
| 586,232 | 7/1897 | English. |
| 877,131 | 1/1908 | Searelle .................. 411/399 |
| 975,285 | 11/1910 | Robertson. |
| 1,084,643 | 1/1914 | Lasater .................. 411/399 |
| 1,151,861 | 8/1915 | Brumbeck. |
| 1,175,665 | 3/1916 | Sweet. |
| 2,956,470 | 10/1960 | Knohl .................. 411/387 |
| 3,044,341 | 7/1962 | Stern. |
| 3,124,031 | 3/1964 | Knohl. |
| 3,136,205 | 6/1964 | Sngingh .................. 411/387 |
| 3,221,588 | 12/1965 | Wieber. |
| 3,463,209 | 5/1966 | Podolsky. |
| 3,903,784 | 9/1975 | Dekker. |
| 3,982,464 | 9/1976 | Sygnator .................. 411/387 |
| 4,241,638 | 12/1980 | Shimizu et al.. |
| 4,655,661 | 4/1987 | Brandt. |
| 4,963,654 | 9/1987 | Bettini. |
| 5,020,954 | 6/1991 | Dreger .................. 411/403 |

FOREIGN PATENT DOCUMENTS 268961  6/1988  European Pat. Off. .......... 411/399

*Primary Examiner*—Neill R. Wilson
*Attorney, Agent, or Firm*—Welsh & Katz, Ltd.

[57] ABSTRACT

A fastener screw includes a head portion, an elongated shank and a multiple-lead thread formed on the shank opposite the head portion. The head portion has a generally planar end surface having a polygonal drive recess therein. A generally longitudinal chip relief slot is formed along the thread and defines a longitudinal thread profile cutting edge. The underside of the head portion is defined by a generally concave annular surface having a plurality of outwardly projecting serrations formed about its periphery which burr into the workpiece and effect a self-locking action therewith as the screw is threaded into the workpiece.

13 Claims, 1 Drawing Sheet

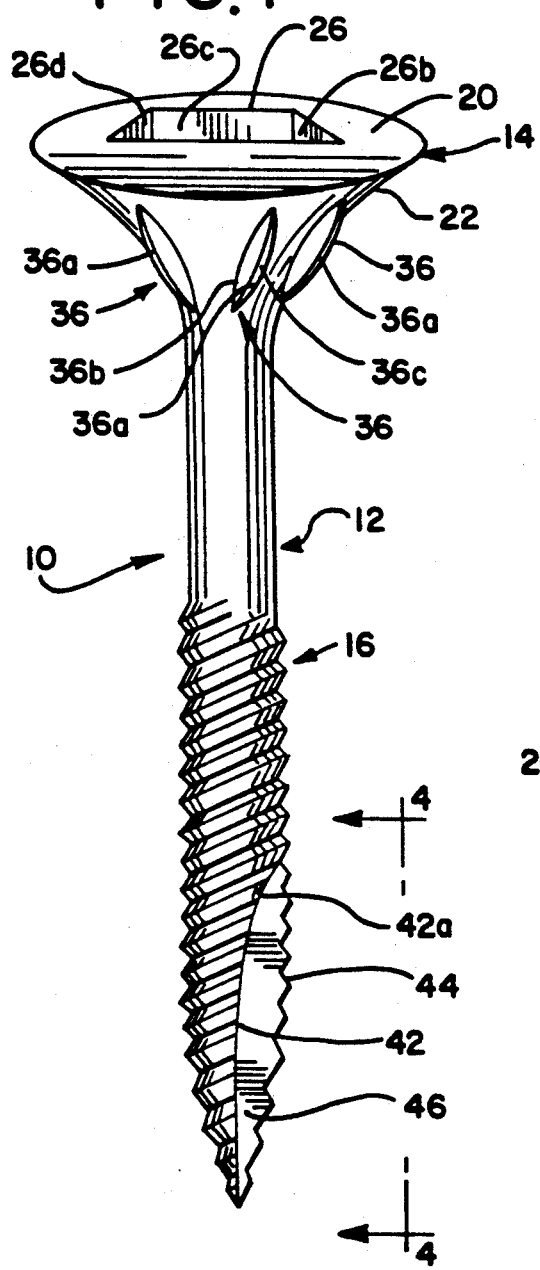
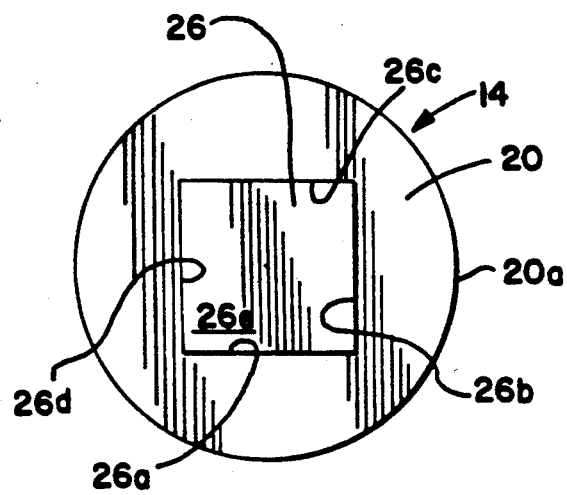
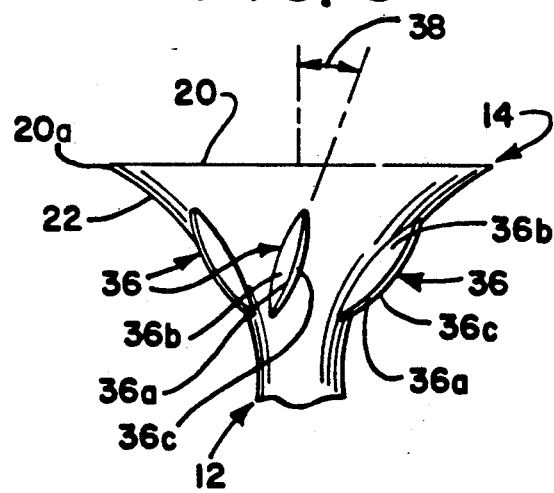
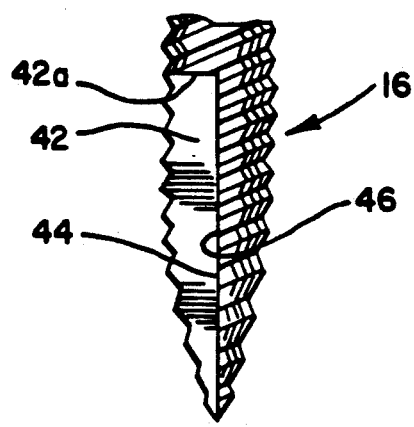

FASTENER SCREW HAVING IMPROVED INSTALLATION AND SELF-LOCKING CHARACTERISTICS

BACKGROUND OF THE INVENTION

The present invention relates generally to fastener screws, and more particular to a novel fastener screw having improved installation and holding characteristics and which finds particular application with work pieces made of wood, wood composites and/or plastics.

In many applications where fastener screws are employed to secure work pieces together, such as two or more pieces of wood or the like, it is desired that the screw be driven into the work pieces sufficiently so that top of the screw head is flush with or recessed below the upper surface of the workpiece. For example, in assembling outside wooden decks, it is a common practice to secure the deck planking to support joists or the like with flathead screws so that no part of the screws protrude above the upper deck surface. Where the deck planking is relatively thick and has been treated or impregnated with a weather resistant material, the wood is generally tougher and more resistant to insertion of fastener screws. Thus, a fastener screw capable of penetrating such work pieces and which can be rapidly driven into the work pieces sufficiently to recess the screw head would greatly reduce installation time with attendant cost savings A problem frequently encountered with known fastener screws in outdoor applications where weather is a factor is that over time the screws may tend to loosen. In applications where the heads of loosened screws may project above a surface over which persons walk, such as an outdoor deck or the like, the protruding screw heads can present significant safety problems, in addition to being obtrusive. Thus, in addition to facilitating rapid installation into one or more work pieces, the fastener screw must be capable of retaining its fastening characteristics over long periods of time without loosening

SUMMARY OF THE INVENTION

One of the primary objects of the present invention is to provide a novel fastener screw which facilitates rapid installation and exhibits improved holding characteristics over known fastener screws.

A more particular object of the present invention is to provide a novel fastener screw which finds particular application in fastening two or more work pieces made of wood, plastic or wood/plastic composite, and wherein the screw facilitates rapid installation with a power drive tool and has a head configuration which upsets the adjacent fibers or surface of the workpiece such that the screw head readily attains a recessed position within the workpiece.

A feature of the fastener screw in accordance with the present invention lies in providing a plurality of circumferentially spaced outwardly projecting serrations or ridges on a lower annular concave undersurface of the screw head such that the serrations assist in burring out adjacent fibers or material of the workpiece as the screw head penetrates the workpiece, thereby enabling the screw head to be drawn more readily into the workpiece to a self-locking recessed or flush position In carrying out the present invention, a metallic fastener screw is provided which has a shank, a head at one end of the shank, and a multiple-lead thread formed on the opposite end of the shank. A polygonal drive recess is formed in a flat end surface of the head and a plurality of angled ridges or serrations are formed circumferentially about a generally concave annular surface on the underside of the head. A needle-shaped lead point is formed at the lead end of the thread. A chip relief slot extends longitudinally along the threaded end of the shank and defines a thread profile cutting edge to effect easier entry into a workpiece. The serrations may be straight or angled relative to the longitudinal axis of the screw and burr out the adjacent material of the workpiece to facilitate a flush or recessed seating of the head while inhibiting loosening of the screw.

Further objects, features and advantages of the present invention will become apparent from the following detailed description of the invention taken in conjunction with the accompanying drawing wherein like reference numerals designate like elements throughout the several views.

BRIEF DESCRIPTION OF THE DRAWING

FIG. 1 is a perspective view of a fastener screw constructed in accordance with the present invention;

FIG. 2 is a plan view of the fastener screw of FIG. 1;

FIG. 3 is a fragmentary elevational view illustrating the angular relation of the serrations formed on the underside of the screw head; and FIG. 4 is a fragmentary elevational view taken substantially along line 4—4 of the FIG. 1.

DETAILED DESCRIPTION

Referring now to the drawing, a fastener screw constructed in accordance with the present invention is indicated generally at 10. The fastener screw 10 is made of a suitable metallic material, preferably a non-corrosive steel such as non-magnetic 300 series stainless steel. Alternatively, the fastener screw may be made of a suitable cold rolled steel. The fastener screw 10 includes a unitary metallic body having a shank 12, a head 14 formed at one end of the shank, and preferably a multiple-lead thread 16 formed on the opposite end of the shank. The fastener screw 10 finds particular application in fastening two or more work pieces made of wood, plastic or wood composites, the latter being compositions of wood fibers intermixed with a suitable binder, such as a polymer, to form a composite workpiece.

When employed to fasten two or more such work pieces together, the fastener screw 10 provides improved installation and holding characteristics through facilitating rapid installation with a power drive device such as an electric or pneumatically driven rotary drive tool. The fastener screw 10 may be of any desired length. A nominal length of approximately 2¼ inches has been found particularly useful when fastening work pieces of approximately 1¼ inch thickness, generally termed a 2 inch nominal thickness.

The shank 12 is of generally cylindrical wire gage and has a diameter generally equal to the pitch diameter of the multiple-lead threaded end 16 which may vary depending upon the length and intended use of the fastener screw. The screw head 14 is formed integral and coaxial with the shank 12 and has an upper flat or planar surface 20 having a circular periphery 20a and lying in a plane substantially transverse to the longitudinal axis of the shank 12. The underside of the head 14 is defined by an annular concave surface 22 intermediate the outer periphery 20a of the flat head surface 20 and the shank 12. The profile of the concave surface 22, as considered in the plane of FIG. 3, may have a generally uniform radius. If desired, the profile of the concave surface 22 may be formed to what is generally termed a bugle-shaped head, that is, a profile wherein the radius of curvature increases from the periphery 20a of the upper surface 20 to the shank 12.

The planar end surface 20 on the screw head 14 has a polygonal shaped drive recess 26 formed therein to facilitate receipt of a correspondingly shaped drive tool for rotational driving of the screw 10. In the illustrated embodiment, the polygonal shaped drive recess 26 takes the form of a rectangular or square recess having four mutually perpendicular equal area sidewalls 26a-d which intersect the top surface 20 in normal relation thereto and intersect a recessed planar bottom surface 26e which lies parallel to the top surface of the screw head. In this manner, the screw 10 may be used with a power drive tool to effect threaded engagement with one or more work pieces, with the polygonal drive recess eliminating cam-out or inadvertent release of the drive tool.

The right-hand thread 16 preferably comprises multiple-lead thread in the form of a double or triple-lead coarse thread similar to a type A sheet metal thread. Thus for each revolution of the fastener screw, it will move longitudinally a distance equal to twice or three times the pitch of the thread. Stated alternatively, each revolution of the fastener screw 10 will cause the screw to move longitudinally into the workpiece twice or three times as fast as would be effected by a single lead thread. The multiple-lead thread 16 terminates at its lower or free end in a needle-shaped point 32 which facilitates entry of the screw into a workpiece without drifting. It will be appreciated that the thread 16 may comprise a single lead thread if the increased longitudinal in feed speed obtained with a multiple-lead thread is not desired.

In accordance with one feature of the present invention, a plurality of self-locking serrations or ridges are formed on the underside of the screw head 14 so as to project outwardly from the convex surface 22. In the embodiment illustrated in FIG. 3, the serrations or ridges are defined by a plurality of equidistantly circumferentially spaced projections or ridges 36 which are formed integral with the screw head and have outwardly projecting convex cutting edges 36a formed by the intersection of two corresponding converging side walls 36b and 36c. In the illustrated embodiment, approximately four to six serrations 36 are formed about the concave surface 22, although fewer or more serrations may be employed as desired. Each of the serrations or ridges 36 extends from slightly below the peripheral edge 20a of the screw head 14 downwardly to a position slightly above the cylindrical surface of the shank 12. Each serration 36 is preferably angled or inclined relative to the longitudinal axis of the fastener screw at an angle in the range of approximately 5-25 degrees, considered as the included angle 38 between the longitudinal axis of the fastener screw and a plane containing the corresponding cutting edge 30a and normal to the plane of FIG. 3. Alternatively, the serrations or ridges 36 and associated cutting edges 36a may extend to the peripheral edge 20a of the screw head and lie parallel to the longitudinal axis of the screw, that is, with the cutting edges 36a lying in planes containing the longitudinal axis of the screw. The serrations 36 and corresponding cutting edges 36a may also have generally S-shaped curvatures or a scalloped configuration, as considered in FIG. 3, such that the lower lead portions of the cutting edges 36a are inclined in the direction of rotation of the screw when threaded into a workpiece. When the screw 10 is threaded into a workpiece, the serrations or ridges 36 bore out or displace the adjacent material, such as wood fibers or wood fibers interspersed with a polymer in a wood/plastic composite material, in a burring action. This enables the screw head to be readily drawn into the workpiece such that the top surface 20 of the screw is flush with or recessed below the surface of the workpiece. The serrations or ridges 36 also effect a self-locking action with the workpiece wherein they substantially inhibit loosening of the screw.

In accordance with another feature of the fastener screw 10, a chip relief slot or flute 42 is formed in the multiple-lead thread 16 so as to extend from the needle point 32 longitudinally along the thread to somewhat beyond the first full diameter thread such as indicated at 42a. As illustrated in FIGS. 1 and 4, the chip relief slot or recess 42 may be formed as a milled or ground slot which generally removes a quadrant of the screw thread 16 leaving a longitudinally extending thread profile cutting edge 44 formed at the intersection of a radial boundary wall 46 with the outer profile of the adjacent thread 16. The cutting edge 44 provides a cutting action as the multiple-lead thread 16 enters the workpiece which facilitates easier movement of the screw into a workpiece. The fibers or other material removed by the cutting edge 44 are compacted into the chip relief slot 42 to further facilitate rapid entry of the fastener screw into the workpiece. Having thus described a preferred embodiment of the fastener screw 10 in accordance with the present invention, it will be appreciated that the fastener screw 10 provides an easy starting, quick driving and self-drilling screw which facilitates use with a power driver. The square shaped drive recess 26 prevents cam-out of the drive tool as is frequently encountered with Phillips-head style screws or the like. Further, the square drive recess enables more precise operator control and provides longer tool life. As the screw is threaded into one or more work pieces, such as wood, plastic or composite wood/plastic material, the bugle-shaped head and corresponding serrations or ridges 36 assist in pulling the screw head into the workpiece to a desired flush or recessed position. The serrations 36 bore out the adjacent surface of the workpiece, thereby easing entry of the screw while effecting a self-locking action to inhibit loosening of the screw after installation. During threading into a workpiece, the longitudinal thread profile cutting edge 44 and associated chip relief slot 42 provide a cutting action on the workpiece and enable the cut fibers and the like to be compacted into the chip relief slot, thereby further facilitating rapid installation of the screw into a workpiece with attendant reduction in installation time and cost.

While a preferred embodiment of the present invention has been illustrated and described, it will be understood that changes and modifications may be made therein without departing from the invention in its broader aspects. Various features of the invention are defined in the following claims.

What is claimed is:

1. A fastener screw comprising a unitary body having a head portion and an elongated shank coaxial with said head portion, said head portion having a generally planar end surface disposed substantially transverse to the longitudinal axis of said shank and having a drive recess therein, said head portion having an underside defined by a generally concave annular surface interposed between said end surface and said shank, said shank having an external thread thereon terminating in a pointed end to facilitate entry of the screw into a workpiece, said external thread having a generally longitudinal chip relief slot formed therein adjacent said pointed end so as to define a longitudinal cutting edge, and a plurality of outwardly projecting serrations formed about the periphery of said concave surface, each of said serrations extending substantially from said end surface to said shank and being inclined relative to the longitudinal axis of the screw in the direction of the thread lead angle so that said serrations burr into the workpiece and effect a self-locking action therewith as the screw is threaded into the workpiece.

2. A fastener screw as defined in claim 1 wherein said external thread terminates in a needle-shape pointed end opposite said head portion, said chip relief slot extending from said pointed end longitudinally of said shank.

3. A fastener screw as defined in claim 2 wherein said chip relief slot is defined along a marginal edge by a thread profile cutting edge.

4. A fastener screw as defined in claim 3 wherein said cutting edge extends parallel to the longitudinal axis of said shank.

5. A fastener screw as defined in claim 1 said external thread comprises a multiple-lead thread.

6. A fastener screw as defined in claim 5 wherein said multiple-lead thread comprises a double or triple-lead thread.

7. A fastener screw as defined in claim 1 wherein said serrations are disposed in equal circumferentially spaced relation about said concave annular surface.

8. A fastener screw as defined in claim 7 wherein said serrations define outer cutting edges having generally arcuate external profile configurations.

9. A fastener screw as defined in claim 1 wherein said drive recess is polygonal in plan view.

10. A fastener screw as defined in claim 9 wherein said drive recess is square in plan view.

11. A fastener screw as defined in claim 10 wherein said recess is defined by mutually perpendicular flat side walls disposed normal to said planar end surface.

12. A fastener screw as defined in claim 1 wherein said screw is made of stainless steel or cold rolled steel.

13. A fastener screw as defined in claim 1 wherein each of aid serrations defines an outer cutting edge which extends substantially from said end surface to said shank.

* * * * *